(12) United States Patent
Dubugnon et al.

(10) Patent No.: US 10,112,230 B2
(45) Date of Patent: Oct. 30, 2018

(54) METHOD FOR MAKING JOINTS BETWEEN SHEET FORMED MEMBERS AND AN APPARATUS FOR CARRYING OUT SAID METHOD

(75) Inventors: Olivier Dubugnon, Vullierens (CH); Jean-Claude Faivre, Renens (CH)

(73) Assignee: ATTEXOR CLINCH SYSTEMS S.A., Ecublens (CH)

( * ) Notice: Subject to any disclaimer, the term of this patent is extended or adjusted under 35 U.S.C. 154(b) by 562 days.

(21) Appl. No.: 13/321,276

(22) PCT Filed: May 27, 2010

(86) PCT No.: PCT/EP2010/057356
§ 371 (c)(1),
(2), (4) Date: Feb. 9, 2012

(87) PCT Pub. No.: WO2010/139606
PCT Pub. Date: Dec. 9, 2010

(65) Prior Publication Data
US 2012/0124805 A1    May 24, 2012

(30) Foreign Application Priority Data
Jun. 5, 2009  (SE) ..................... 0950412

(51) Int. Cl.
*B23P 11/00*    (2006.01)
*B21D 39/03*    (2006.01)
(Continued)

(52) U.S. Cl.
CPC .......... *B21D 39/031* (2013.01); *B21D 39/03* (2013.01); *F16B 5/045* (2013.01); *F16B 11/006* (2013.01);
(Continued)

(58) Field of Classification Search
CPC .. Y10S 411/968; B23P 19/062; B21D 39/031; B21D 39/03; B21D 39/035;
(Continued)

(56) References Cited

U.S. PATENT DOCUMENTS 4,835,850 A    6/1989    Eckold
5,051,020 A    9/1991    Schleicher
(Continued)

FOREIGN PATENT DOCUMENTS

DE    102007033126 A1 *  1/2009
JP         6218454 A      8/1994
JP        2008290111 A   12/2008

OTHER PUBLICATIONS

Dictionary.com—definition of clinch.*
(Continued)

*Primary Examiner* — David Bryant
*Assistant Examiner* — Lee A Holly
(74) *Attorney, Agent, or Firm* — Jeffrey S. Melcher; Manelli Selter PLLC

(57) ABSTRACT

Method and apparatus for joining superimposed sheet formed material with an intermediate layer of adhesive together by means of gluing in combination with clinching, at which a tool comprising a first and a second co-axial tool parts, co-operate for producing said joint, said first tool part comprising a punch (1) with an impact surface, surrounded by a stripper (2) with an impact surface, said second tool part comprising a die with an impact surface surrounding a die cavity at the bottom of which an anvil with an impact surface is arranged. In a step before making the clinch joint positioning and locking said punch (1) and said stripper (2) of said first tool part relative to each other so that said impact surfaces present a first, common, squeezing surface (6) of the first tool part, having essentially the same size and form
(Continued)

as a second, squeezing surface of the second tool part. Then squeezing together the work pieces (9, 10) with the intermediate layer of adhesive over a surface corresponding to said squeezing surfaces in order to laterally displace excessive adhesive out from the corresponding area of the work pieces.

6 Claims, 5 Drawing Sheets

(51) Int. Cl.
*F16B 5/04* (2006.01)
*F16B 11/00* (2006.01)

(52) U.S. Cl.
CPC .......... *Y10T 29/49826* (2015.01); *Y10T 29/53* (2015.01)

(58) Field of Classification Search
CPC . B21K 25/00; B06B 1/08; H01L 41/12; B21J 15/025
USPC ................ 29/505, 521, 522.1, 525
See application file for complete search history.

(56) References Cited

U.S. PATENT DOCUMENTS

| | | | |
|---|---|---|---|
| 5,621,961 A * | 4/1997 | Schleicher | 29/509 |
| 6,092,270 A * | 7/2000 | Sawdon | 29/243.5 |
| 6,986,301 B2 | 1/2006 | Wade | |
| 2003/0037428 A1 * | 2/2003 | Wang et al. | 29/521 |
| 2005/0177993 A1 * | 8/2005 | Bergkvist | 29/514 |
| 2006/0168792 A1 | 8/2006 | Reatherford | |
| 2008/0149256 A1 * | 6/2008 | Wang | B21J 15/025 156/92 |
| 2009/0077786 A1 * | 3/2009 | Lang et al. | 29/505 |
| 2010/0183404 A1 * | 7/2010 | Draht et al. | 411/455 |

OTHER PUBLICATIONS

Google.com—definition of clinch.*
Merriam_Webster.com definition of clinch.*
English translation of Office Action issued in Chinese Patent Application No. 201080032589.3, dated Nov. 5, 2013, pp. 1-14.
International Search Report and Written Opinion (dated Nov. 29, 2010).

* cited by examiner

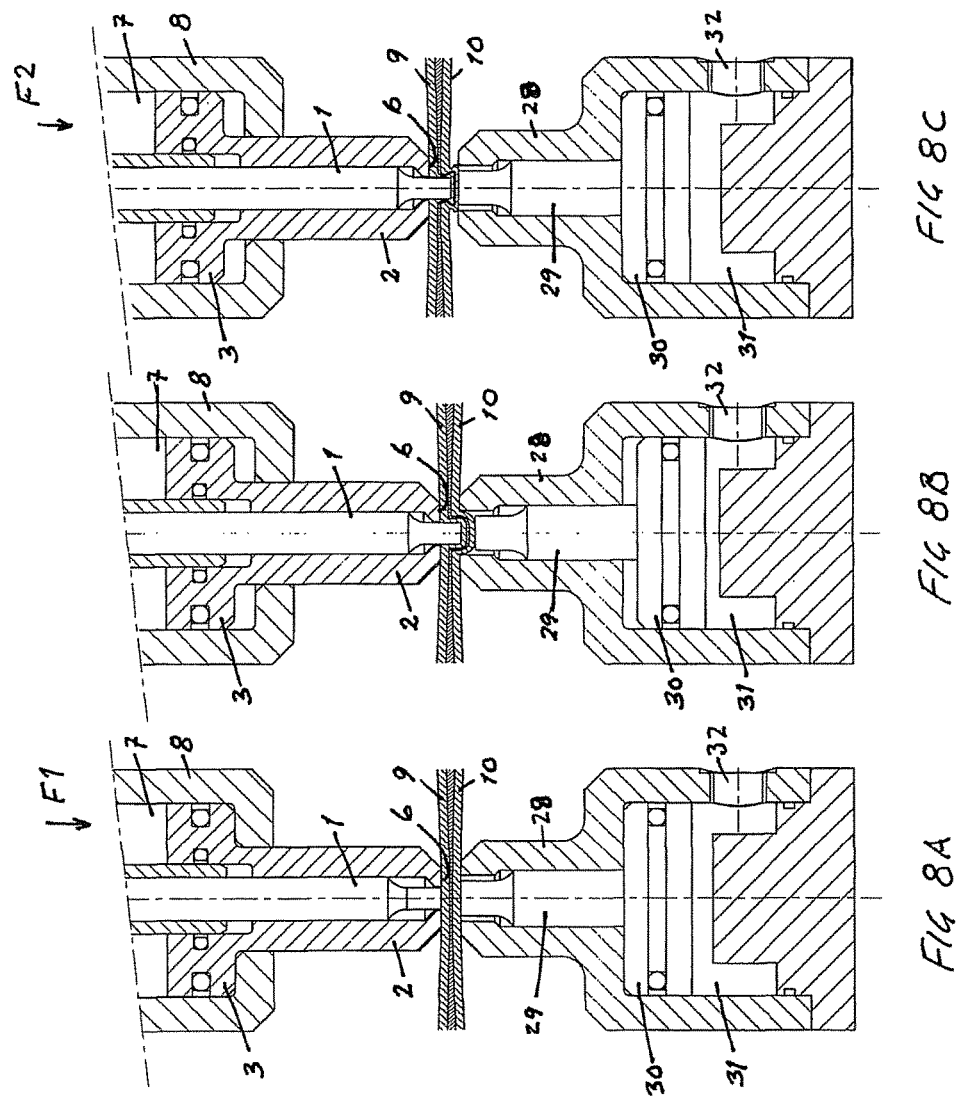

METHOD FOR MAKING JOINTS BETWEEN SHEET FORMED MEMBERS AND AN APPARATUS FOR CARRYING OUT SAID METHOD

CROSS-REFERENCE TO RELATED APPLICATIONS

This application is a national stage entry under 35 U.S.C. 371 of International Application No. PCT/EP2010/057356, filed 27 May 2010, designating the United States. This application claims foreign priority under 35 U.S.C. 119 and 365 to Swedish Patent Application No. 0950412-7, filed 5 Jun. 2009. The complete contents of these applications are incorporated herein by reference.

TECHNICAL FIELD

The present invention refers to a method for joining sheet formed material of the same or different types, metal or non-metal, together by means of gluing in combination with clinching. The invention also refers to an apparatus for carrying out said method.

The apparatuses or machines could be of stationary or hand-held type and the power source could e.g. be electric or hydraulic or pneumatic.

BACKGROUND ART

Methods and apparatuses for joining sheet formed members together, thereby producing leak proof or non-leak proof joints, are well known in the prior art.

A joint of this type could be made by means of drawing said sheet formed members into a cup-shaped or protruding portion having a cylindrical or slightly conical side wall and a bottom wall and subsequently compressing said bottom wall creating a lateral extrusion of the same thereby forming a laterally enlarged shape which mechanically interlocks the sheet formed members. This technique is usually referred to as clinching in the art.

The methods and tools according to the prior art make use of the well known one or two step principles. In the one step method the whole procedure for making the joint takes place during one single relative movement between a punch and a co-operating die and anvil. In a two step method the final compression of the material takes place during a second squeezing operation outside the die cavity.

A suitable tool comprises generally two separate tool parts, which co-operate for producing said joint. A first tool part has the form of a punch which in a linear movement is driven in the direction of a co-axial second tool part in the form of a die with a die cavity at the bottom of which an anvil is arranged.

For making the joint the sheet formed members are usually positioned against, and resting on, the second tool part, the die, which could be provided with movable die elements arranged in certain embodiments sliding laterally on a support surface against the forces from a spring element. The spring element is generally constituted by a ring made of an elastomer or a toroid formed metal spring surrounding the movable die elements.

When gluing sheet formed material together the combination with clinching is very useful for fixing the work pieces together in predefined relative positions before the adhesive is cured.

However, when making a clinch joint between two work pieces positioned on top of each other with an intermediate layer of viscous, not yet cured, adhesive, excessive adhesive in the area where the clinch joint is to be made will be detrimental to the quality of the joint.

Therefore, before the actual joining process starts adhesive has to be locally removed from the area of the intended joint.

BRIEF DESCRIPTION OF THE INVENTION

One object of the present invention is to provide a method for making joints between superimposed sheet formed members with an intermediate layer of a viscous adhesive, which creates joints of high quality.

By means of the method according to the invention adhesive is displaced from the area where the joint is going to be made before the actual joining of the work pieces is taking place. This means that the undesired effects of excessive adhesive will be minimized.

A further object of the present invention is to provide an apparatus for carrying out the method according to the invention.

The present invention, which provides a solution to the said technical problems, is characterized according to the appended claims.

BRIEF DESCRIPTION OF THE FIGURES

Other objects and advantages of this invention will be apparent from the reading of this description, which proceeds with reference to the accompanying drawings forming part thereof and wherein:

FIG. 8A-C show three steps or phases in a further embodiment of the method according to the invention.

DETAILED DESCRIPTION OF THE INVENTION

Figure 1:
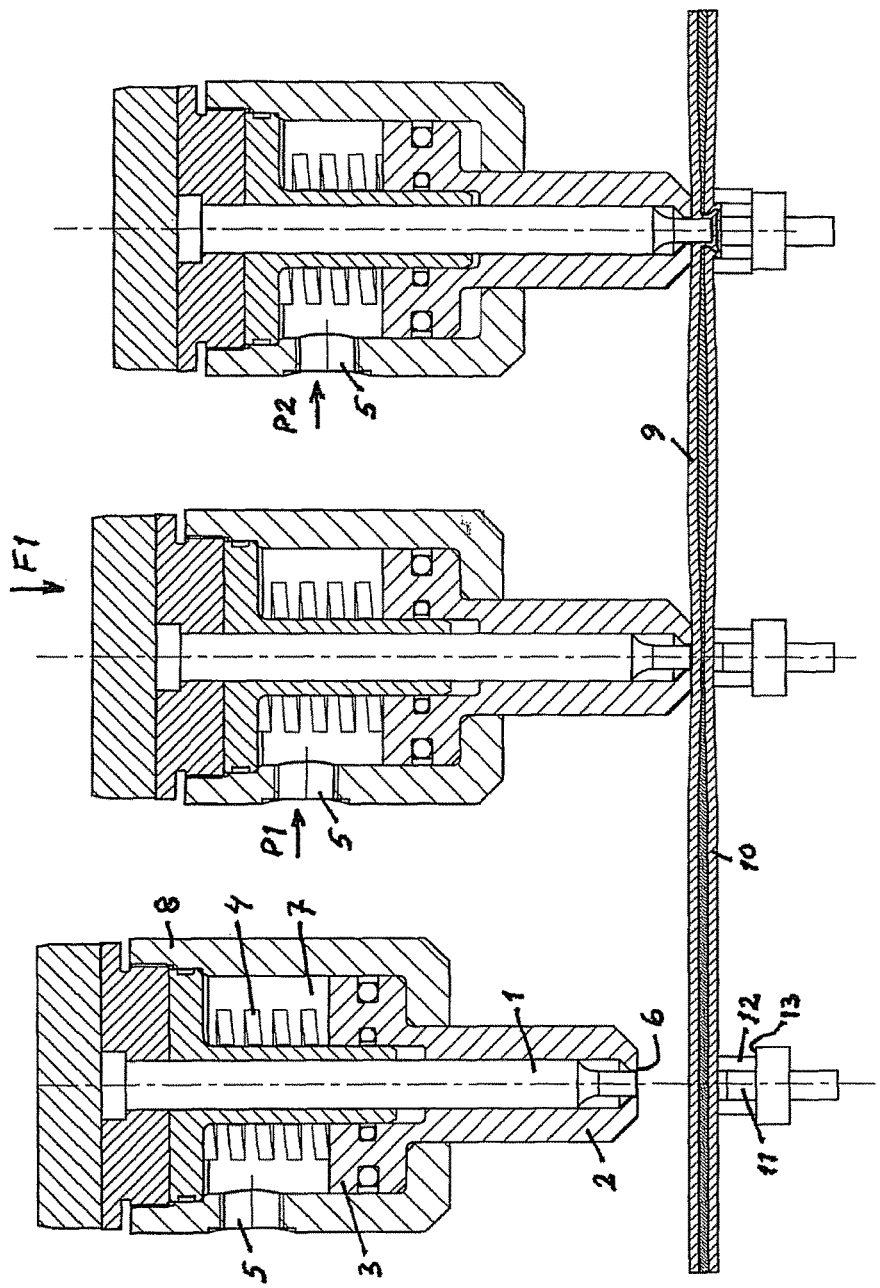
FIGS. 1A-C show three steps or phases in a first embodiment of the method according to the invention.

To simplify the description it is in the following assumed that the two tool parts are working together along a vertical axis with the punch and stripper of the first tool part moving downwards against a die-anvil combination of a static second tool part. It is however clear that said axis can have any orientation in space without changing the principle of the present invention. And it is also clear that the movements of the tool parts could be reversed so that said second tool part will be moved against a static first tool part.

FIGS. 1A-C show three steps or phases in a first embodiment of the method according to the invention.

FIG. 1A shows a tool head 8 comprising a punch 1 and a stripper 2. The punch 1 is arranged fixed to the tool head 8 while the stripper 2 is movable co-axially with the tool head 8.

In a first phase the punch 1 and the stripper 2 are positioned relative to each other and the tool head 8, vertically displaced so that they together present a common, essentially flat, lower surface 6 formed by the essentially flat impact surface of the punch and the surrounding ring formed essentially flat impact surface of the stripper. In FIG. 1A the stripper is mounted on a cylinder-piston arrangement 7, 3 forming an integral part of the tool head 8. The piston 3 is biased in its lower position by means of a spring 4. This arrangement forms the initial state of the first tool part.

Two work pieces 9, 10 positioned on top of each other with an intermediate layer of viscous, not yet cured, adhesive are resting against the top surface of the second static tool part. This tool part which is only schematically illustrated comprises in this embodiment an anvil 11 and a die having two or several laterally displaceable die elements 12. The die elements are in this example shown resting against a support surface 13 perpendicular to the vertical axis of the tool part.

In the illustrated example the support surface for the work pieces shows a cavity which is the die cavity exposed to the lower side of the work pieces 10 resting against the die impact surface. Further examples of the second tool part will be described later.

In the second phase, illustrated in FIG. 1B, the entire tool head 8 is lowered to reach contact with the upper work piece 9 to be joined together with the lower work piece 10 by means of gluing in combination with clinching. A first force F1 is applied to the tool head 8 and at the same time or before a pneumatic or preferably hydraulic pressure P1 is applied to the cylinder 7 through the opening 5.

Figure 2:
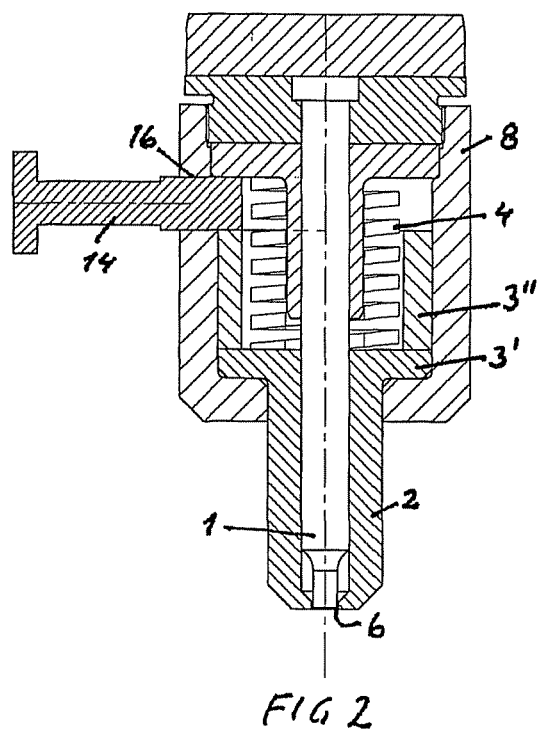
FIG. 2 shows a second embodiment of a tool head according to the invention.

The force from the hydraulic pressure P1 on the piston surface plus the force from the spring 4 should be bigger than or equal to the force F1. This arrangement locks the piston and the stripper in a relative vertical position in the tool head before contact with the work pieces to create the essentially flat lower common impact surface 6 according to the above. There are of course other ways to lock the stripper to the tool head and punch in this phase, e.g. by means of mechanical arrangements as shown in FIG. 2.

The work pieces including the intermediate layer of adhesive are in contact with both tool parts and will now be squeezed together which means that excessive adhesive will be displaced out from the area where the joint is to be made. This lateral movement of the adhesive is dependent on the process parameters in this phase, like the force F1, the viscosity of the adhesive, the size and form of the essentially flat surface etc. It is possible to adjust the process parameters in order to reach the desired result in a very short time. Very good results have been achieved with a squeezing surface twice as large as the active surface of the punch but as will be described in relation to FIG. 6 the inventive idea also covers the use of considerably larger squeezing surfaces. The embodiment of FIG. 6 has e.g. a squeezing surface in the order of 60 times the active surface of the punch.

In order to increase the efficiency of the outward flow of the adhesive, heat could be added to the work pieces, especially in the second phase, by means of increasing the temperature of the portions of the first and/or second tool parts contacting the work pieces. In the embodiment shown in FIG. 7 as an alternative or complement heat could also be added to the work pieces by means of heated rollers 27.

The control of the thickness of the remaining adhesive can be made by means of a mechanical stop means for the movement of the tool head (not shown) or by means of a programmable actuator or a servo-controlled actuator allowing control of the end position of the tool head. A final thickness of the adhesive layer in the joint area could e.g. typically be of the order 0.1 to 0.2 mm.

It is in this example assumed that the thickness and material of the work pieces allow the method to work with a die-anvil combination in the second tool part of the illustrated type, i.e. the work pieces resting on the die impact surface only.

In the third phase the fixed vertical position between the punch and the stripper is not any longer maintained.

As shown in FIG. 1C after the application of a pressure P2<P1 or after a complete pressure release in the cylinder in the tool head the stripper is now released and remain essentially in the same position while the punch can move further downward carrying out the active part of the stroke making the clinch joint the usual way. This might be carried out as a result of the pressure release only or after an increase of the downward force on the tool head or a combination of these measures. As a result a proper clinch joint is created fixing the position between the work pieces.

FIG. 2 shows a second embodiment of a tool head according to the invention.

The punch 1 is in this embodiment, as in the embodiment according to FIG. 1, arranged fixed to the tool head 8 and the stripper 2 is as before movable co-axially within the tool head 8.

As in FIG. 1 the stripper 2 is mounted on a piston 3', 3" moving in cylinder forming an integral part of the tool head 8. The positioning of the punch and the stripper relative to each other and the tool head during the first phase will be achieved by means of the biasing spring 4 as in the previously described embodiment.

In the second phase, corresponding to the FIG. 1B, the entire tool head 8 is lowered, as before, to reach contact with the upper work piece 9 to be joined together with the lower work piece 10 by means of gluing in combination with clinching. A first force F1 is, as before, applied to the tool head 8 and at the same time or slightly before the relative positions between the punch, stripper and tool head are locked by means of a spacer 14 which by means of a lateral movement through an opening 16 can block the vertical movement of the stripper 2 relative to the punch by blocking the vertical movement of the piston 3', 3". The essentially flat lower, common impact surface 6 will in this way be solidified. The squeezing operation will then be carried out as described above.

In the third phase the fixed vertical position between the punch and the stripper is not any longer maintained as described above.

In the third phase, corresponding to the FIG. 1C, the spacer 14 will be retracted releasing the stripper 2 which is now free to move relative to the punch 6. The stripper remain essentially in the same position while the punch can move further downward carrying out the active part of the stroke making the clinch joint the usual way.

This might be carried out as a result of the release of the stripper only or after an increase of the downward force on the tool head or a combination of these measures. As a result a proper clinch joint is created fixing the position between the work pieces.

Figure 3:
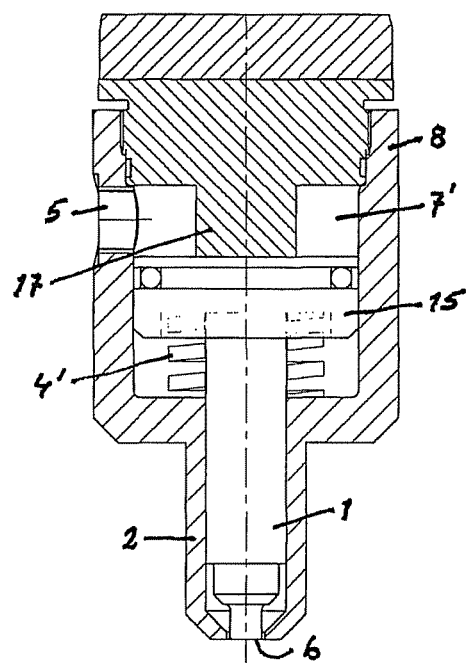
FIG. 3 shows a third embodiment of a tool head according to the invention.

FIG. 3 shows a third embodiment of a tool head according to the invention.

In this embodiment the stripper is arranged fixed to the tool head while the punch 1 can be moved co-axially within the tool head.

The positioning of the punch and the stripper relative to each other and the tool head during the first phase will in this embodiment be achieved by means of the biasing spring 4' which is lifting the piston 15 to contact a stop means 17.

In the second phase, corresponding to the FIG. 1B, the entire tool head 8 is lowered, as before, to reach contact with the upper work piece 9 to be joined together with the lower work piece 10 by means of gluing in combination with clinching. A first force F1 is, as before, applied to the tool head 8.

The relative positions between the punch, stripper and tool head are already locked in this case. The essentially flat lower, common impact surface 6 is therefore already solidified. The squeezing operation will then be carried out as described above.

In the third phase the fixed vertical position between the punch and the stripper is not any longer maintained as described above.

In the third phase, corresponding to the FIG. 1C, while the tool head and the stripper remain essentially in the same vertical position, a hydraulic pressure is now applied to the cylinder 7' in the tool head which will force the piston 15 and the punch to move downwards to carry out the active part of the stroke making the clinch joint the usual way.

As a result a proper clinch joint is created fixing the position between the work pieces.

It would of course be possible to use double piston arrangements in the tool head in which the punch and the stripper are independently vertically moveable relative to each other controlled by means of two hydraulic pressures.

Figure 4A:
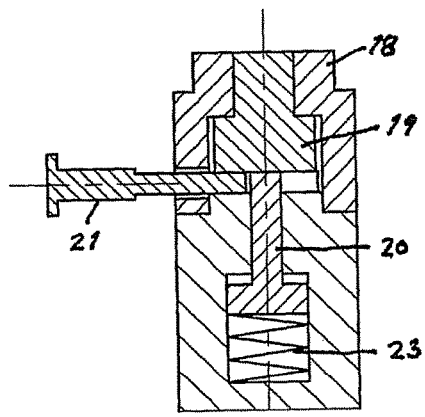
FIGS. 4A-B show a second tool part with a die-anvil arrangement which can be used in the method according to the invention.
Figure 4B:
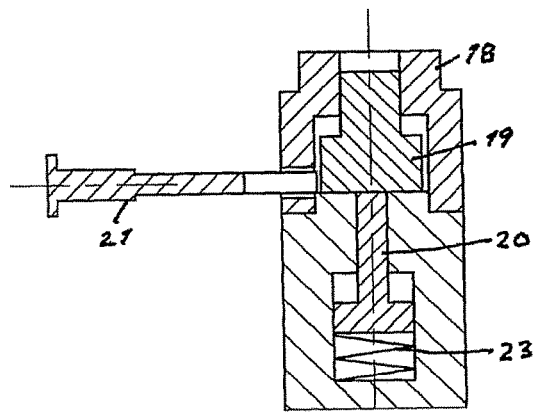

FIGS. 4A-B show a second tool part with a die-anvil arrangement which can be used in the method according to the invention.

FIG. 4A shows a second tool part with a fixed die 18 and a vertically movable anvil 19 which is biased upwards by means of a pusher 20 and a spring 23. In the initial position, as shown in FIG. 4A, the anvil can be locked with the upper surface of the anvil flush with the upper surface of the die by means of pushing the mechanical spacer 21 in under the anvil 19. The combined upper surface will be the active surface in the second phase of the method when the excessive adhesive will be squeezed out from the clinching area.

In FIG. 4B is illustrated the relative position between the die and anvil at the end of the third phase according to the invention. The spacer has been retracted so that the anvil can move freely between two predetermined end positions. The final squeezing of the work pieces in the joint takes place with the anvil in the position as illustrated.

Figure 5:
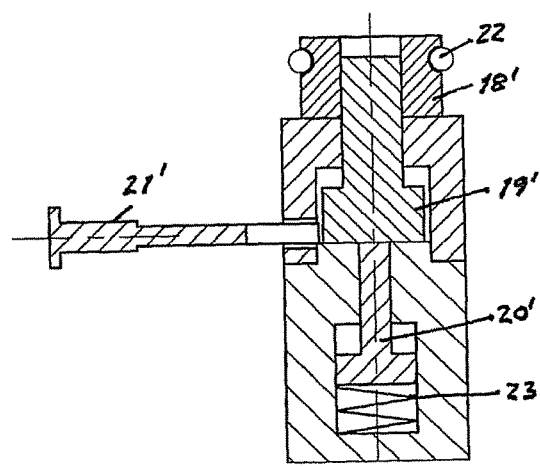
FIG. 5 shows another die-anvil arrangement, which can be used in the method according to the invention

FIG. 5 shows another die-anvil arrangement, which can be used in the method according to the invention.

This embodiment of the second tool part is essentially the same as the one described with reference to FIGS. 4 A-B. The difference resides in the arrangement of the die. In this case the die is provided with at least two laterally movable die parts 18' biased against the anvil 19' by means of resilient means 22. The tool part works in the different phases of the method the same way as described with reference to FIGS. 4A-B.

Figure 6:
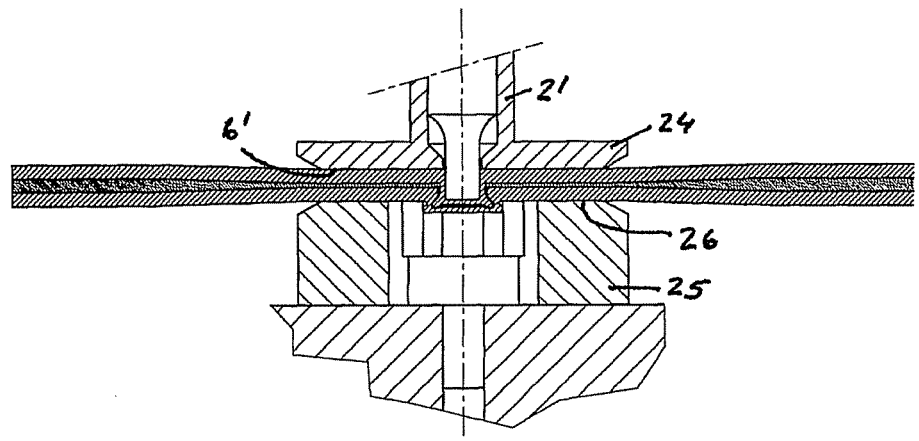
FIG. 6 shows an embodiment of the co-operating tool parts according to the invention.

FIG. 6 shows an embodiment of the co-operating tool parts according to the invention.

The stripper 2' of the first tool part is in this embodiment provided with a foot 24 considerably increasing the essentially flat, lower surface 6 formed by the essentially flat impact surface of the punch and the surrounding essentially flat impact surface of the stripper.

The second tool part has in this embodiment also been provided with means in order to increase the top surface to a corresponding size and form. A support element 25 with a top surface 26, flush with the top surface of the die, is arranged around the die-anvil combination. When using a die with laterally movable die elements as illustrated e.g. in FIGS. 1A-C and FIG. 5 a space has to be left between the support element and die-anvil combination as shown in the figure. On the other hand, if an arrangement of the second tool part like the one illustrated in FIGS. 4A-B is used, then no free space around the die-anvil combination is needed which gives an essentially flat homogenous upper support surface for the squeezing according to the second phase in the method according to the invention.

Figure 7:
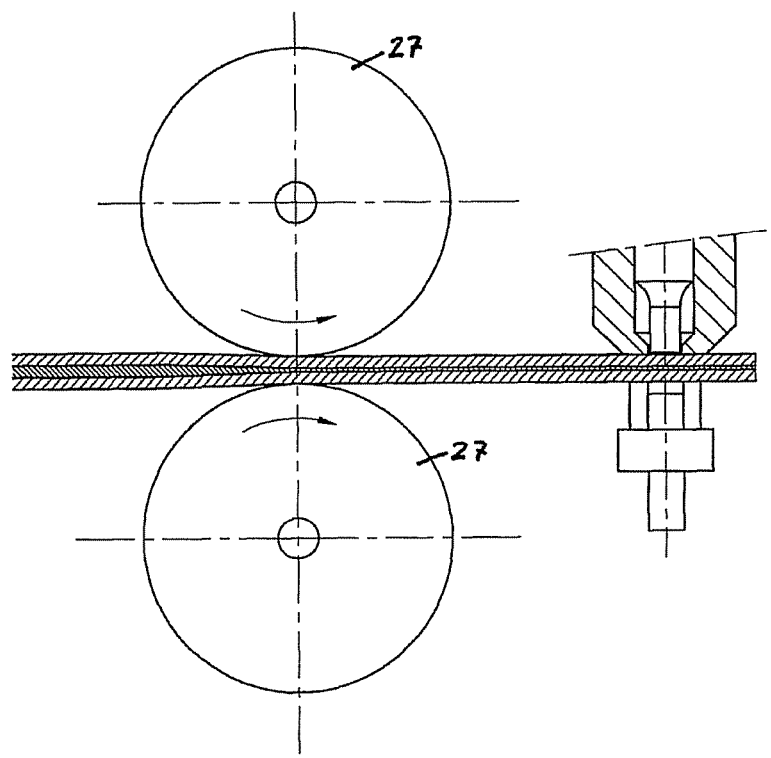
FIG. 7 shows in schematically a further embodiment for displacing adhesive according to the invention.

FIG. 7 shows in schematically a further embodiment for displacing adhesive according to the invention.

A robot arm or the foot 24 itself could additionally be provided with support rollers 27, which can be motorized. When making a longer essentially straight joint by means of gluing a robot can move the clinching apparatus along the edge with the rollers in contact at least intermittently with the sheet formed members to be joined pressing them together at least when passing an area where a clinch joint is to be made, thereby removing excess glue from the clinching area. In order to overcome the rolling resistance (friction) the rollers could be driven by a motor.

FIG. 8A-C show three steps or phases in a further embodiment of the method according to the invention.

FIG. 8A illustrates mainly the same phase of the procedure as FIG. 1B described above. The first tool part, i.e. the upper tool part in the FIGS. 8A-C, here shown schematically, can be implemented as described in connection to FIGS. 1A-C above. Thus, the punch 1 is arranged fixed to the tool head 8 while the stripper 2 is movable co-axially with said tool head.

Two work pieces 9, 10 positioned on top of each other with an intermediate layer of viscous, not yet cured, adhesive are resting against the top surface of the second static tool part. In this embodiment the second tool part is provided with a fixed die 28 and a co-axial, vertically movable anvil 29 operated by a hydraulic piston-cylinder combination 30, 31. A hydraulic pressure applied to the inlet opening 32 will force the piston 30 upwards and position the top surface of the anvil flush with the upper surface of the die. The anvil is locked in this position by means of the hydraulic pressure. A spring (not shown) can additionally be arranged in the cylinder 31 co-operating with the hydraulic pressure to move the anvil into position.

The combined generally flat upper surface of the die and anvil will co-act with the surface 6 on the first tool part when the excessive adhesive in this phase is squeezed out from the clinching area.

Thus, as in FIG. 1B, the FIG. 8A shows the relative positions of the tool parts and work pieces when the entire tool head 8 due to the application of a first force F1 has been lowered to reach contact with the upper work piece 9 to be joined together with the lower work piece 10 by means of gluing in combination with clinching. At the same time or before a pneumatic or preferably hydraulic pressure P1 has been applied to the cylinder 7, cf. FIG. 1 and the relevant part of the description, through the opening 5.

The work pieces including the intermediate layer of adhesive are in contact with both tool parts and will now be squeezed together which means that excessive adhesive will be displaced out from the area where the joint is to be made.

The same range of sizes of the squeezing surfaces as described above will also apply to this embodiment. Application of heat and control of the final thickness of the adhesive layer are also modifications to this embodiment.

In the next step or phase, illustrated in FIG. 8B, the fixed vertical position between the punch 1 and the stripper 2 in the first, upper tool part is not any longer maintained.

As shown in FIG. 8B, after the application of a pressure P2<P1 or after a complete pressure release in the cylinder 7 in the tool head 8, cf. FIG. 1C, the stripper 2 is now released and remain essentially in the same position relative to the second tool part and the work pieces 9, 10 while the punch 1 can move further downward drawing material down into the die 28 creating a cup-formed protrusion with an essentially cylindrical sidewall and a horizontal bottom wall. In order to make this possible the pressure in the cylinder 31 has also to be decreased letting the piston 30 controlling the vertical position of the anvil 29 move downwards.

In the method according to this embodiment the final squeezing of the cup-formed protrusion and formation of the joint is not taking place inside the die 28.

In the next phase, as shown in FIG. 8C, the application of an increased hydraulic pressure in the cylinder 31 in the second tool part will move the piston 30 and the anvil 29 upwards, lifting the work pieces with the cup-formed protrusion and the first tool part. The top surface of the second tool part is now again essentially flat, as in the position illustrated in FIG. 8A. At this stage the tool head 8 including the punch 1 is again moved downwards by means of the application of a second force F2 with the result that the bottom wall of the cup-formed protrusion will be squeezed and expanded laterally which creates the clinch joint.

It could be noted that the second tool part as illustrated in the FIGS. 8A-C could be replaced by a second tool part according to FIGS. 4A and 4B.

As described with reference to FIG. 6 and already mentioned above the squeezing surfaces of the first and second tool parts could be increased in this embodiment as well.

The invention claimed is:

1. A method for joining superimposed work pieces in the form of sheet formed material of the same or different types, metal or non-metal, together by means of gluing with an appropriate adhesive in combination with clinching to form a clinch joint between the work pieces, at which a tool comprising a first and a second separate generally co-axial tool parts, co-operate for producing said joint, wherein said first tool part comprises a punch with a generally flat impact surface, surrounded by a stripper with a generally flat impact surface, and wherein said second tool part comprises a die with a generally flat impact surface surrounding a die cavity at the bottom of which an anvil with a generally flat impact surface is arranged, the method comprising the steps of:
   a) positioning the work pieces with an intermediate layer of adhesive between said first and second tool parts;
   b) driving said punch of said first tool part in the direction of said co-operating die and anvil of said second tool part to form said joint between said work pieces by drawing said work pieces into a cup-shaped or protruding portion having a side wall and a bottom wall and subsequently compressing said bottom wall creating a lateral extrusion of the same thereby forming a laterally enlarged shape which mechanically interlocks the work pieces, wherein the method further comprises the following steps before said step b:
   A) positioning and locking said punch and said stripper of said first tool part relative to each other so that said generally flat impact surfaces present a first, common, essentially flat impact or squeezing surface of the first tool part, having essentially the same size and form as a second, essentially flat impact or squeezing surface of the second tool part comprising at least said generally flat impact surface of the die;
   B) approaching said squeezing surfaces relative to each other to contact the work pieces from opposite sides; and
   C) applying a force to at least one of said impact or squeezing surfaces of the first and second tool parts squeezing together the work pieces with the intermediate layer of adhesive over a surface corresponding to said impact or squeezing surfaces in order to laterally displace excessive adhesive out from the corresponding area of the work pieces, wherein the clinch joint between the work pieces is solely the combination of the adhesive and the mechanical interlocking between the work pieces.

2. The method according to claim 1, wherein said second tool part comprises a fixed or movable die with a generally flat impact surface surrounding a die cavity with a co-axially moveable anvil with a generally flat impact surface, and wherein said anvil is arranged to be pushed by actuation means into a locking position with its impact surface flush with the impact surface of the die, locking means are arranged to lock said movable anvil in a longitudinal position relative to said die at which the impact surface of said anvil coincides with the impact surface of said die to form a common generally flat impact surface in the locked position.

3. The apparatus according to claim 2, wherein said actuation means comprises a pusher biased by a spring acting on said anvil, and said locking means comprises a mechanical spacer which by means of a lateral movement can block the movement of said anvil, relative to the die thereby locking said anvil in said locking position.

4. The method according to claim 1, wherein said first, common, essentially flat impact or squeezing surface of the first tool part, is at least twice as large as the impact surface of the punch.

5. The method according to claim 1, wherein the first tool part further comprises a tool head, said punch is arranged fixed to said tool head and said stripper is fixed to a piston forming part of a cylinder-piston assembly in said tool head, wherein said locking means comprises a spring biasing said piston towards one end position of its movement and a cylinder compartment which can be pressurised from the outside of the tool head through an opening in the tool head in order to lock said stripper in said locked position.

6. A method for joining superimposed work pieces in the form of sheet formed material of the same or different types, metal or non-metal, together by means of gluing with an appropriate adhesive in combination with clinching to form a clinch joint between the work pieces, at which a tool comprising a first and a second separate generally co-axial tool parts, co-operate for producing said joint, wherein said first tool part comprises a punch with a generally flat impact surface, surrounded by a stripper with a generally flat impact surface, and wherein said second tool part comprises a die with a generally flat impact surface surrounding a die cavity at the bottom of which an anvil with a generally flat impact surface is arranged, the method comprising the steps of:
   a) positioning the work pieces with an intermediate layer of adhesive between said first and second tool parts;
   b) driving said punch of said first tool part in the direction of said co-operating die and anvil of said second tool part to form said joint between said work pieces by drawing said work pieces into a cup-shaped or protruding portion having a side wall and a bottom wall and subsequently compressing said bottom wall creating a lateral extrusion of the same thereby forming a laterally enlarged shape which mechanically interlocks the work pieces, wherein the method further comprises the following steps before said step b:
A) positioning and locking said punch and said stripper of said first tool part relative to each other so that said generally flat impact surfaces present a first, common, essentially flat impact or squeezing surface of the first tool part, having essentially the same size and form as a second, essentially flat impact or squeezing surface of the second tool part comprising at least said generally flat impact surface of the die;
B) approaching said squeezing surfaces relative to each other to contact the work pieces from opposite sides; and C) applying a force to at least one of said impact or squeezing surfaces of the first and second tool parts squeezing together the work pieces with the intermediate layer of adhesive over a surface corresponding to said impact or squeezing surfaces in order to laterally displace excessive adhesive out from the corresponding area of the work pieces, wherein the clinch joint joins the work pieces without piercing through the work pieces to provide moisture resistance.

* * * * *